United States Patent [19]

Deglis et al.

[11] Patent Number: 5,062,653
[45] Date of Patent: Nov. 5, 1991

[54] MULTIPURPOSE RECREATIONAL CART

[76] Inventors: Janis W. Deglis, 612 North St., Feeding Hills, Mass. 01030; Robert C. Amrich, 50 Shady Hill La., Glastonbury, Conn. 06033

[21] Appl. No.: 436,327

[22] Filed: Nov. 14, 1989

[51] Int. Cl.⁵ .............................................. B62B 11/00
[52] U.S. Cl. ...................................... 280/648; 280/37; 280/654; 280/655; 280/47.25; 297/129; 297/183; 297/184
[58] Field of Search ............... 62/457.7; 280/648, 650, 280/652, 47.18, 47.19, 47.25, 47.26, 37, 30, 654, 655, 655.1; 297/118, 129, 183, 184

[56] References Cited

U.S. PATENT DOCUMENTS

| | | | |
|---|---|---|---|
| 450,527 | 4/1891 | Poyner | 62/457.7 X |
| 1,086,795 | 2/1914 | Tarrant | 280/47.26 |
| 2,728,581 | 12/1955 | Goebert et al. | 280/47.26 X |
| 2,982,562 | 5/1961 | Gladstein | 280/648 |
| 3,222,081 | 12/1965 | Harmon, Jr. | 280/648 |
| 3,236,538 | 2/1966 | Johansen | 280/47.31 |
| 3,301,358 | 1/1967 | Rubens | 280/47.31 X |
| 4,733,905 | 3/1988 | Buickerood et al. | 280/47.25 X |

Primary Examiner—Andres Kashnikow
Assistant Examiner—Michael Mar
Attorney, Agent, or Firm—Paul G. Lunn

[57] ABSTRACT

A multipurpose recreational cart comprised of a round barrel shaped body, a handle for pushing or pulling the cart, a lid opening to expose the interior of the barrel and a chair pivotally connected in the interior of the barrel such that when the lid is opened a chair is exposed.

5 Claims, 5 Drawing Sheets

MULTIPURPOSE RECREATIONAL CART

FIELD OF THE INVENTION

The present invention relates to recreational carts useful in transporting various objects to a beach or camp site.

BACKGROUND OF THE INVENTION

A problem which has plagued many recreationalists and sportsmen is the task of carrying items such as coolers, chairs, towels and steros from a car or bus to the beach, camp site or picnic area.

U.S. Pat. No. 3,301,358 shows a hand luggage cart comprised of a barrel shaped container which opens up to allow luggage to be placed in the barrel. However, it would be of limited use for the beach or a picnic because its only function is to transport a few items and cannot readily be used for any other function associated with outdoor recreational activities.

SUMMARY OF THE INVENTION

The present invention is a multipurpose cart comprised of a barrel-shaped container. Means for pushing or pulling cart from one point to another are attached to the cart. The barrel opens to reveal an upper and lower storage area. The upper storage unit is self-contained, removable and may be insulated to form a cooler. Contained within the barrel is a chair which unfolds when the barrel is opened.

In a preferred embodiment, wheels are attached to each end of the barrel such that the wheels rotate but the barrel remains stationary while the cart is being pushed or pulled.

DETAILED DESCRIPTION OF THE INVENTION

Figure 1:
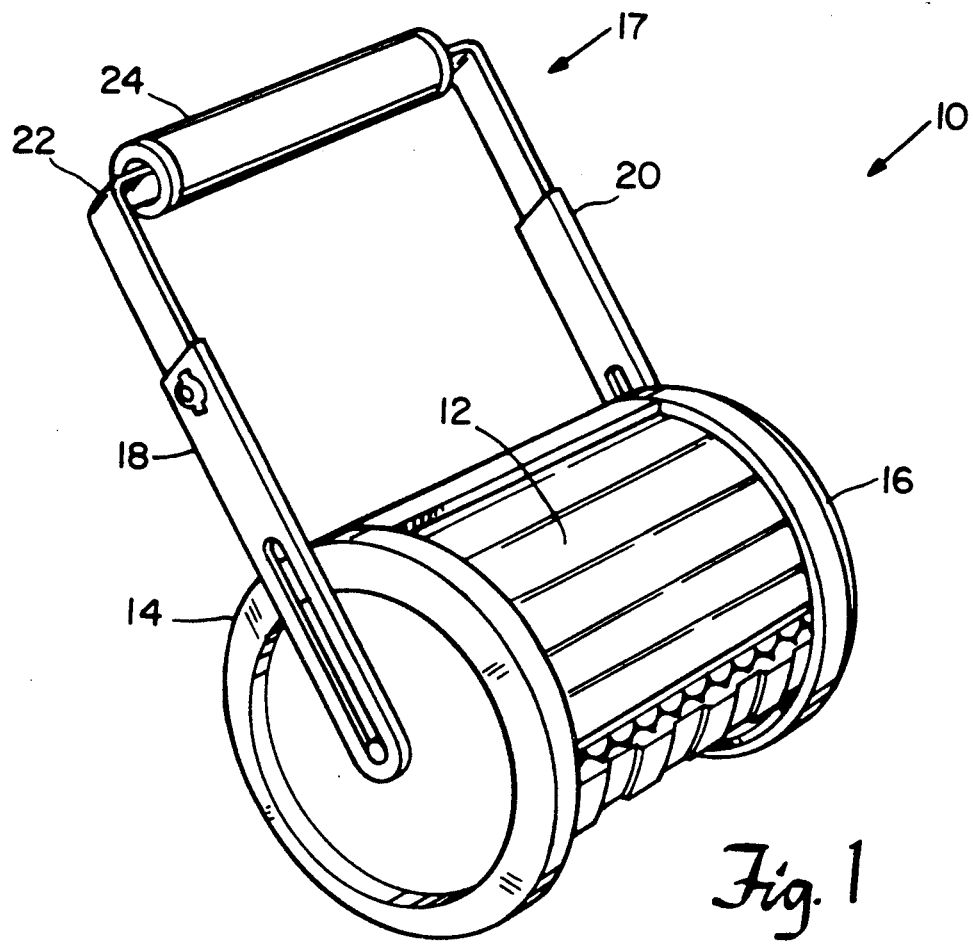
FIG. 1 shows a perspective view of a preferred embodiment of the cart of the present invention in a closed position with the handle extended.
Figure 4:
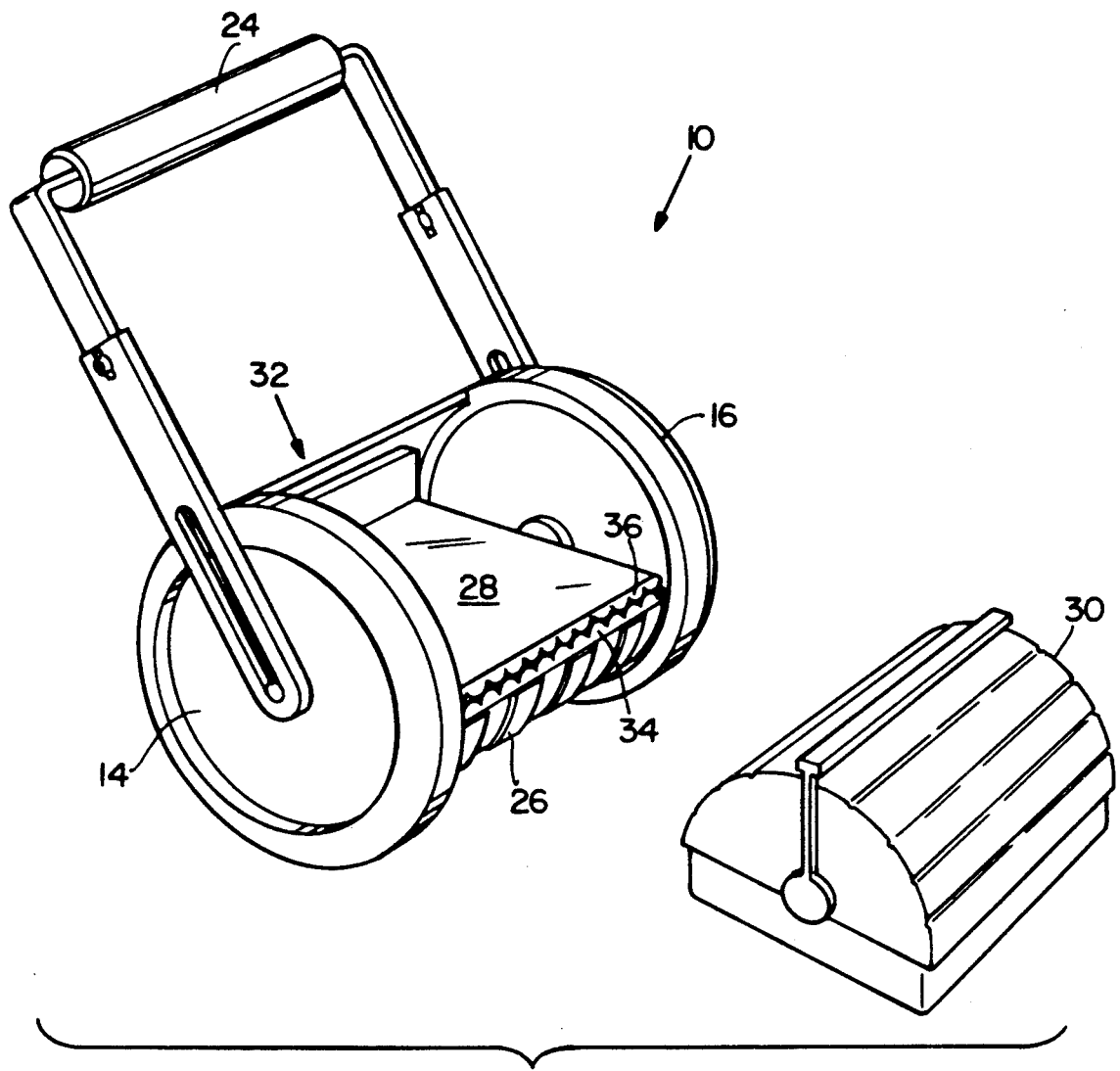
FIG. 4 shows a perspective view of a preferred embodiment of the cart of the present invention in a partially opened position with the handle extended.

FIG. 1 shows a barrel shaped cart 10. Cart 10 is comprised of a middle section 12 and wheels 14 and 16 connected to opposite ends of middle section 12. Preferably, middle section 12 remains stationary while wheels 14 and 16 rotate. Extending from wheels 14 and 16 are legs 18 and 20 of a handle 17. Legs 18 and 20 extend out away from cart 10 and attach to opposite ends of a cross bar 22. Wrapped around cross bar 22 is a shade 24 which can extend out as is shown in FIG. 4.

Figure 2:
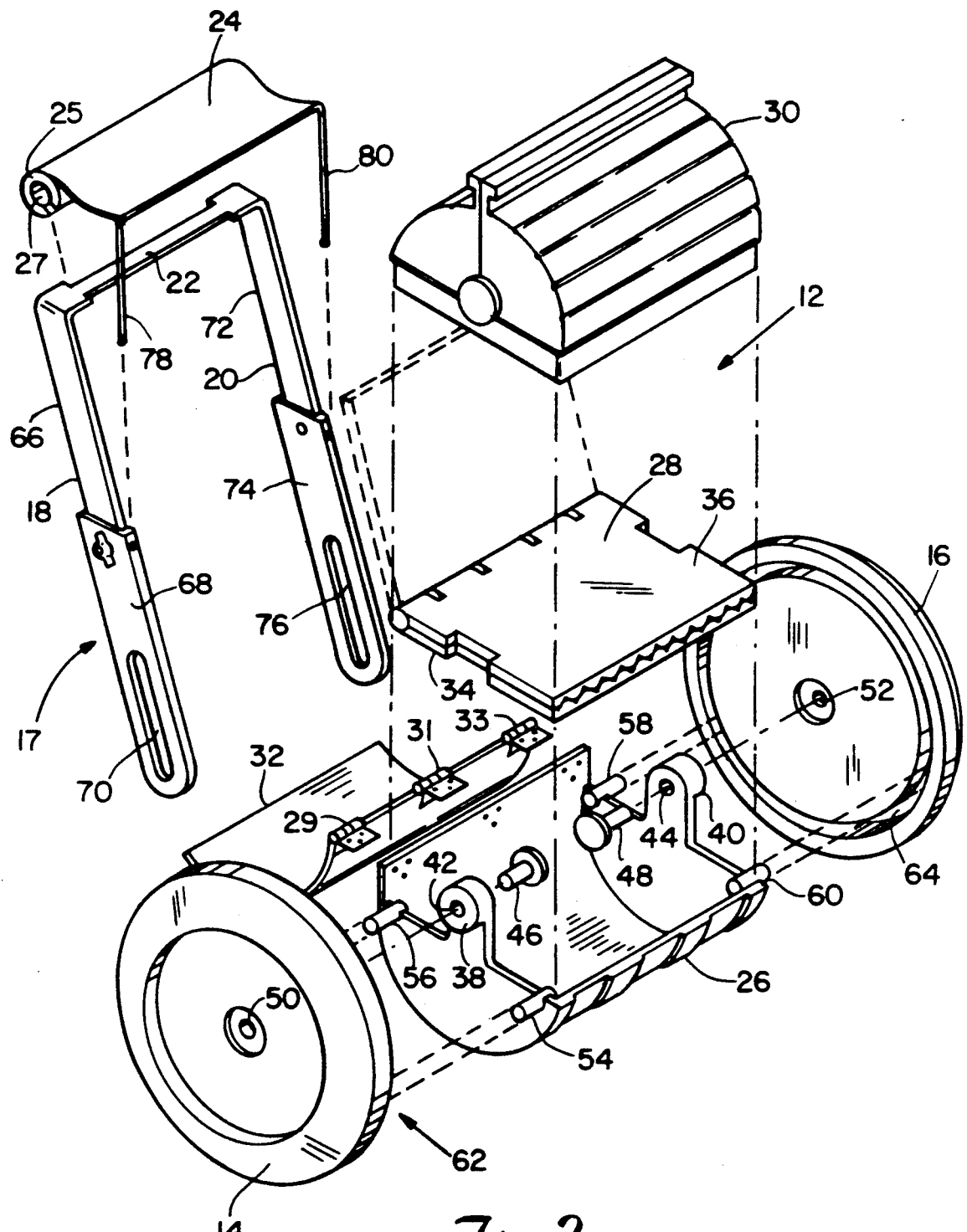
FIG. 2 shows a perspective view of the cart of the present invention disassembled.

FIG. 2 shows a disassembled view of the preferred embodiment of the present invention. Middle section 12 is comprised of a lower section 26, a chair assembly unit 28, a removable upper storage compartment 30 and a lid 32 which is connected to lower section 26 by means of hinges 29, 31 and 33. Lid 32 shuts to contain upper storage section 30 and chair assembly 28 within middle section 12.

Chair assembly is comprised of a seat 34 and backrest 36. Chair assembly 28 is pivotally connected to lower section 26 such that chair assembly 28 can be lifted up to expose storage space within lower section 26. When lid 32 is unfolded it also serves to support the backrest of the chair.

Wheels 14 and 16 are attached to wheel connection assemblies 38 and 40 respectively which extend up from opposite ends of lower section 26. Holes 42 and 44 extend through wheel connection assemblies 38 and 40 respectively. Axle pins 46 and 48 extend through holes 42 and 44 respectively and extend into and through holes 50 and 52 contained within the center of wheels 14 and 16 respectively. Rods 54, 56, 58 and 60 extend out of the four corners of lower section 26. Rods 54 and 56 insert into annular groove 62 (not shown) recessed within the inner side of wheel 14. Likewise, rods 58 and 60 insert into annular groove 64 recessed within the inner side of wheel 16. In this manner the wheels can rotate while middle section 12 remains stationary and stable.

Cart handle 17 is comprised of legs 18 and 20 joined together by cross bar 22. Leg 18 is comprised of two sections, upper leg 66 and lower leg 68. Lower leg 68 is wider than upper leg 66 and lower leg 68 has side edges which extend out in an 'L' shape such that upper leg 66 slides into lower leg 68. Lower leg 68 has an elongated slot 70. Upon exiting hole 50 within wheel 14 axle pin 46 proceeds through slot 70 of lower leg 68 so as to connect leg 18 to barrel 12. Likewise, leg 20 has an upper leg 72 and a lower leg 74. Lower leg 74 is wider than upper leg 72 and lower leg 74 has side edges which extend out in an 'L' shape such that upper leg 72 can slide into lower leg 74. Lower leg 74 has an elongated slot 76 present towards its lower end. Upon exiting hole 52 within wheel 16 axle pin 48 proceeds through slot 76 of lower leg 74 so as to connect leg 20 to barrel 12. In this way handle assembly 17 is attached to cart 12 thus allowing 12 to be pushed or pulled.

Shade 24 is wrapped around rod 25 which has a hollow core 27 which fits over cross bar 22. Shade 24 is further supported by support rods 78 and 80 which are attached to opposite corners of the end of shade 24 which is not connected to rod 25. The end of support rod 78 which is not connected to a corner of shade 24 is pivotally connected to leg 18 and the end of support rod 80 which is not connected to a corner of shade 24 is pivotally connected to leg 20.

Figure 3:
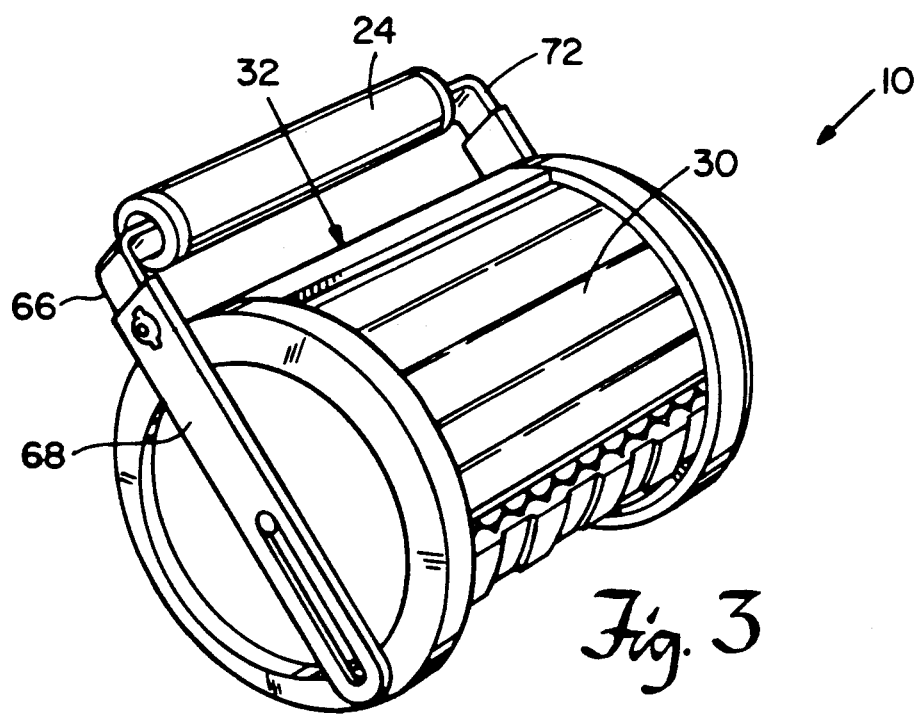
FIG. 3 shows a perspective view of a preferred embodiment of the cart of the present invention in a closed position with the handle non-extended.

FIG. 3 shows cart 10 of the present invention in a folded compact position applicable for storing in an automobile trunk. Upper legs 66 and 72 are inserted totally within lower legs 68 and 74 respectively. Lid 32 is closed and shade 24 is rolled up and upper section 30 is in place.

Figure 5A:
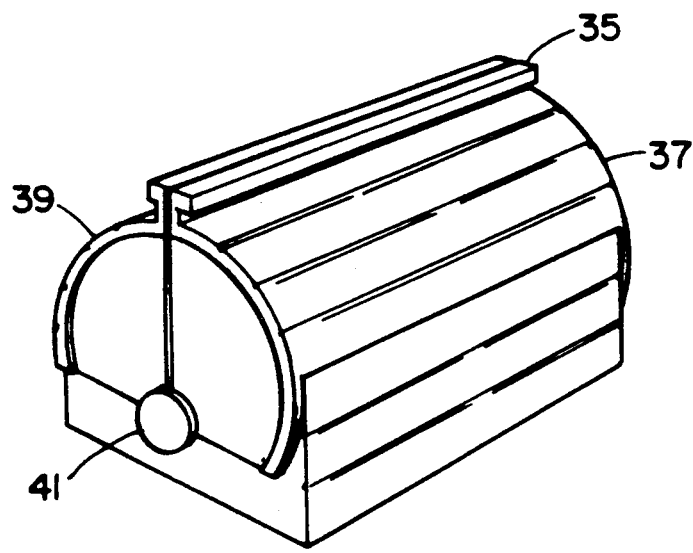
FIG. 5 shows a perspective of an inner, removable compartment both closed and opened up.
Figure 5B:
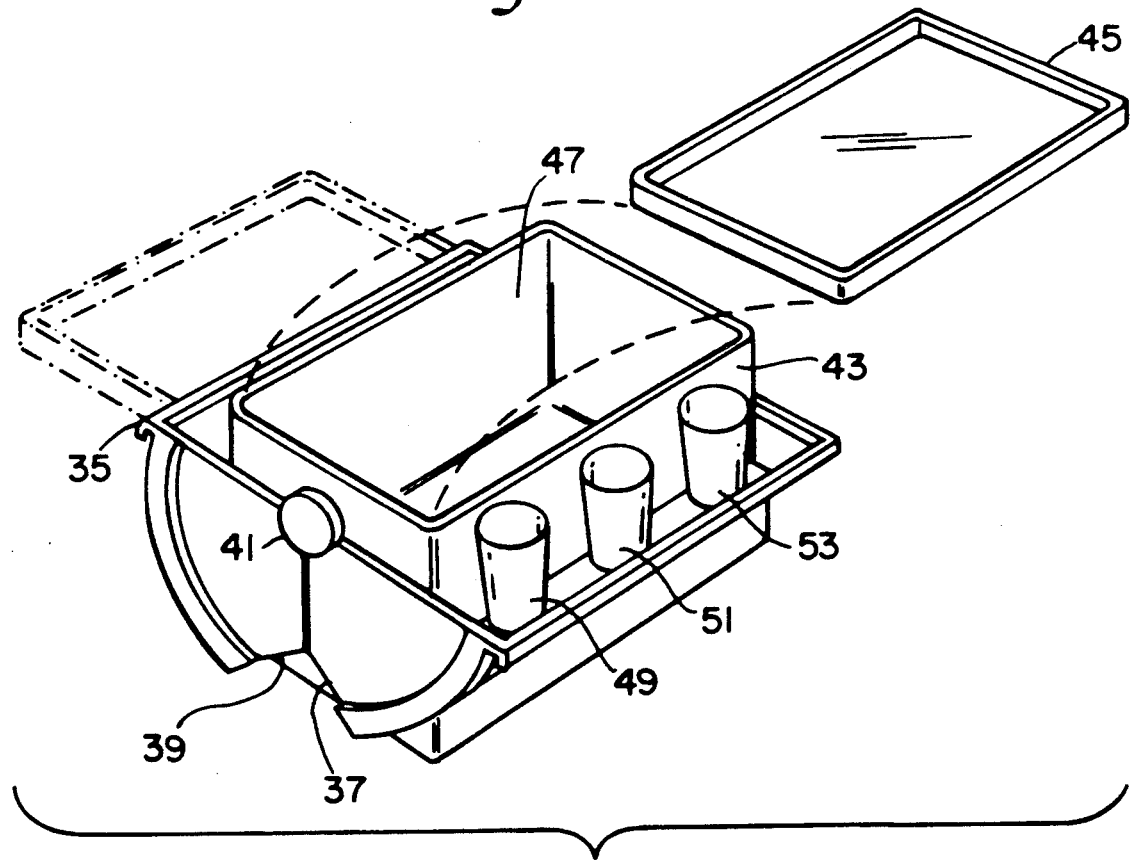

FIG. 4 shows lid 32 unfolded and upper section 30 having an outer lid 35 which is shaped to conform to the circumference of lid 32 is removed. Upper section 30 is shown in more detail in FIG. 5. Upper section 30 is comprised of lid 35 having two halves 37 and 39 which swing open along axis 41 to reveal storage space. Within upper section 30 is a cooler 43 having lid 45 and storage compartment 47. Also contained within upper section 30 is a convenient holding compartments for drink containers 49, 51, and 53.

Figure 6:
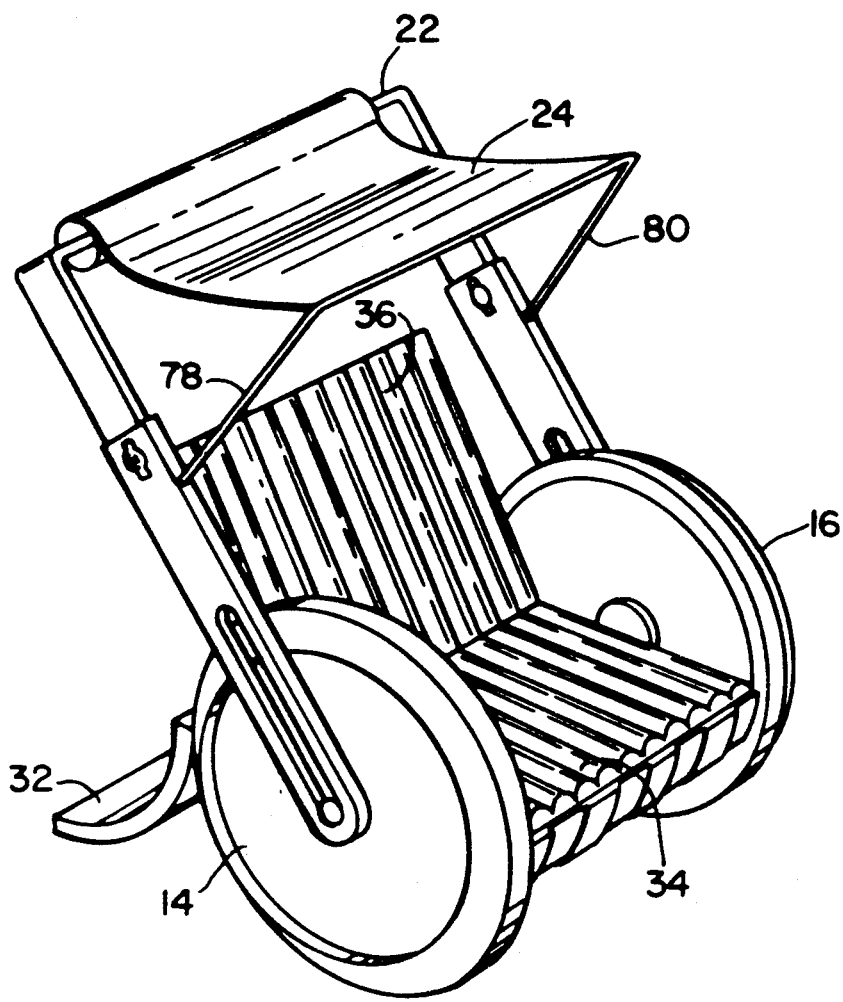
FIG. 6 shows a perspective view of a preferred embodiment of the cart of the present invention in an opened position with the handle extended.

FIG. 6 shows cart 10 being opened so that it converts into a seat. Lid 32 is opened and placed rearward to give support to the cart. Back 36 is flipped up to expose seat 34 thus creating a chair. Shade 24 is drawn out to give protection from the sun.

INDUSTRIAL APPLICABILITY

The present invention is a multipurpose cart applicable in the recreation industry.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

We claim:

1. A multipurpose cart comprising a barrel shaped body having a circular cross-section and transversely opposed planar end portions, said body including a semi-cylindrical lower section having a rectangular top opening and a semi-cylindrical lid pivotally attached to the lower section, a pair of transverse axle pins extending through respective ones of said end portions, an inverted U-shaped handle having a pair of legs, a lower end of each leg being secured to a respective axle pin, a pair of wheels, each wheel extending between a respective one of said legs and end portions, and supported for rotation by a respective one of said axle pins, a chair including a planar seat portion and a planar backrest portion pivotally connected to the seat portion for movement between an extended use position and a folded storage position, and means on said lower section for supporting said seat portion with said seat portion extending substantially along a plane formed by the opening in the top of said lower section, wherein the cart provides storage space within said lower section and said lid when said chair is in the folded position and the lid is pivoted to a closed position.

2. A multipurpose cart as recited in claim 1, further comprising:
    a removable storage container contained within the interior of the barrel, said storage container being shaped to conform to the circumference of the barrel.

3. A multipurpose cart as recited in claim 2, wherein the storage container is thermally insulated.

4. A multipurpose cart as recited in claim 1, further comprising:
    means for shading an occupant of the chair, said shading means being attached to and extending from said handle.

5. A multipurpose cart as recited in claim 4, wherein said shading means is wrapped around a cross bar of said handle, said shade being able to unwind so as to shade an occupant seated in the chair.

* * * * *